United States Patent
Poursartip et al.

(10) Patent No.: US 12,008,643 B1
(45) Date of Patent: *Jun. 11, 2024

(54) CLASSIFIER PERFORMING ELIGIBILITY DETERMINATION

(71) Applicant: BLOCK, INC., San Francisco, CA (US)

(72) Inventors: Ariana Poursartip, San Francisco, CA (US); John Bryan Scott, San Francisco, CA (US); Kevin Teh, San Francisco, CA (US)

(73) Assignee: BLOCK, INC., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,038

(22) Filed: Oct. 14, 2022

Related U.S. Application Data

(63) Continuation of application No. 16/596,903, filed on Oct. 9, 2019, now Pat. No. 11,481,839, which is a
(Continued)

(51) Int. Cl.
*G06Q 40/00* (2023.01)
*G06F 18/214* (2023.01)
(Continued)

(52) U.S. Cl.
CPC ........... *G06Q 40/03* (2023.01); *G06F 18/214* (2023.01)

(58) Field of Classification Search
CPC .............................. G06Q 40/03; G06F 18/214
(Continued)

(56) References Cited

U.S. PATENT DOCUMENTS 5,696,907 A 12/1997 Tom
6,826,544 B1 11/2004 Johnson
(Continued)

FOREIGN PATENT DOCUMENTS

WO 99/03076 A1 1/1999

OTHER PUBLICATIONS

"Oracle Retail Advanced Inventory Planning," www.oracle.com, pp. 1-2 (2013).
(Continued)

*Primary Examiner* — Hai Tran
(74) *Attorney, Agent, or Firm* — MATTINGLY & MALUR, PC

(57) ABSTRACT

In some examples, a payment server processes a plurality of transactions between a plurality of customers and a plurality of merchants, and trains a classifier with training data to obtain a trained classifier. The training data used for training the classifier includes the transaction information. The payment server inputs, to the trained classifier, information related to one or more transactions that are associated with a particular user, and may determine, based on an output from the trained classifier, an eligibility of the user to receive an offer for financing. The payment server generates the offer for the financing for an amount determined based at least in part on the eligibility of the user, and causes presentation of the offer on a computing device of the user. Based at least on receiving an indication of acceptance of the offer, the payment server sends an instruction for providing the financing.

20 Claims, 5 Drawing Sheets

Related U.S. Application Data continuation of application No. 14/491,958, filed on Sep. 19, 2014, now Pat. No. 10,445,826.

(60) Provisional application No. 62/003,000, filed on May 26, 2014.

(51) Int. Cl.
  *G06Q 20/10* (2012.01)
  *G06Q 20/24* (2012.01)
  *G06Q 40/02* (2023.01)
  *G06Q 40/03* (2023.01)

(58) Field of Classification Search
  USPC .................................................. 705/35–45
  See application file for complete search history.

(56) References Cited

U.S. PATENT DOCUMENTS

| | | |
|---|---|---|
| 6,941,281 B1 | 9/2005 | Johnson |
| 7,035,821 B1 | 4/2006 | Smith, II et al. |
| 7,103,570 B1 | 9/2006 | Morea et al. |
| 7,181,427 B1 | 2/2007 | DeFrancesco et al. |
| 7,953,653 B2 | 5/2011 | Siggers et al. |
| 8,150,764 B2 | 4/2012 | Crowe et al. |
| 8,239,227 B2 | 8/2012 | Megiddo et al. |
| 8,606,695 B1 | 12/2013 | Arora et al. |
| 8,666,847 B1 | 3/2014 | Blank et al. |
| 8,732,040 B1 | 5/2014 | Prabhune et al. |
| 9,727,912 B1 | 8/2017 | Poursartip et al. |
| 9,786,005 B1 | 10/2017 | Poursartip et al. |
| 9,824,394 B1 | 11/2017 | Boates et al. |
| 9,836,786 B1 | 12/2017 | Baker |
| 9,892,458 B1 | 2/2018 | Shearer et al. |
| 9,984,412 B1 | 5/2018 | Poursartip et al. |
| 10,019,698 B1 | 7/2018 | Scott et al. |
| 10,062,109 B1 | 8/2018 | Poursartip et al. |
| 10,346,907 B1 | 7/2019 | Poursartip et al. |
| 10,410,243 B2 * | 9/2019 | Boal ................ G06Q 30/0207 |
| 10,445,826 B1 | 10/2019 | Poursartip et al. |
| 10,453,086 B1 | 10/2019 | Scott et al. |
| 10,455,826 B2 | 10/2019 | Palomares et al. |
| 10,540,713 B2 * | 1/2020 | Frohwein ................ G06Q 40/08 |
| 10,607,286 B1 | 3/2020 | Poursartip et al. |
| 10,902,512 B1 | 1/2021 | Fern et al. |
| 11,100,576 B1 | 8/2021 | Poursartip et al. |
| 11,367,096 B1 | 6/2022 | Scott et al. |
| 11,481,839 B1 | 10/2022 | Poursartip et al. |
| 11,593,876 B1 | 2/2023 | Fern et al. |
| 2001/0034681 A1 | 10/2001 | Abbott et al. |
| 2002/0138412 A1 | 9/2002 | Englert |
| 2002/0174061 A1 | 11/2002 | Srinivasan et al. |
| 2003/0101107 A1 | 5/2003 | Agarwal et al. |
| 2003/0130959 A1 | 7/2003 | Rosenbaum |
| 2004/0054625 A1 | 3/2004 | Kellogg et al. |
| 2004/0064398 A1 | 4/2004 | Browne et al. |
| 2004/0193540 A1 | 9/2004 | Brown et al. |
| 2006/0095350 A1 | 5/2006 | Hall et al. |
| 2006/0224480 A1 | 10/2006 | Bent et al. |
| 2007/0156579 A1 | 7/2007 | Manesh |
| 2007/0156584 A1 | 7/2007 | Barnes et al. |
| 2007/0174191 A1 | 7/2007 | Keaton et al. |
| 2007/0244779 A1 | 10/2007 | Wolff |
| 2007/0255635 A1 | 11/2007 | Multer et al. |
| 2007/0255653 A1 | 11/2007 | Tumminaro et al. |
| 2008/0033825 A1 | 2/2008 | Goldin |
| 2008/0052229 A1 | 2/2008 | Sheinker et al. |
| 2008/0086410 A1 | 4/2008 | MacGuire |
| 2009/0006249 A1 | 1/2009 | Morgan et al. |
| 2009/0043697 A1 | 2/2009 | Jacobs et al. |
| 2009/0187482 A1 | 7/2009 | Blount et al. |
| 2010/0017324 A1 | 1/2010 | Brownhill et al. |
| 2010/0223154 A1 | 9/2010 | Frohwein et al. |
| 2010/0228651 A1 | 9/2010 | Becerra et al. |
| 2010/0299251 A1 | 11/2010 | Thomas |
| 2010/0306071 A1 | 12/2010 | Kay |
| 2011/0166987 A1 | 7/2011 | Hu et al. |
| 2011/0191173 A1 | 8/2011 | Blackhurst et al. |
| 2011/0191239 A1 | 8/2011 | Blackhurst et al. |
| 2011/0251870 A1 | 10/2011 | Tavares et al. |
| 2012/0022945 A1 | 1/2012 | Falkenborg et al. |
| 2012/0036032 A1 | 2/2012 | Frohwein et al. |
| 2012/0054097 A1 | 3/2012 | Frohwein et al. |
| 2012/0066033 A1 | 3/2012 | Frohwein et al. |
| 2012/0089436 A1 | 4/2012 | Tavares et al. |
| 2012/0173416 A1 | 7/2012 | Bayne |
| 2012/0191506 A1 | 7/2012 | Tavares et al. |
| 2012/0209734 A1 | 8/2012 | Brooks et al. |
| 2012/0233010 A1 | 9/2012 | Frohwein et al. |
| 2012/0233090 A1 | 9/2012 | Tavares et al. |
| 2012/0239552 A1 | 9/2012 | Harycki |
| 2012/0271765 A1 | 10/2012 | Cervenka et al. |
| 2013/0030879 A1 | 1/2013 | Munjal |
| 2013/0085804 A1 | 4/2013 | Leff et al. |
| 2013/0138544 A1 | 5/2013 | Chapman |
| 2013/0211892 A1 | 8/2013 | Frohwein et al. |
| 2013/0268417 A1 | 10/2013 | Sgueglia |
| 2014/0006202 A1 * | 1/2014 | Frohwein ................ G06Q 40/03 |
| | | 705/26.3 |
| 2014/0019236 A1 | 1/2014 | Argue et al. |
| 2014/0025525 A1 | 1/2014 | Frohwein et al. |
| 2014/0058804 A1 | 2/2014 | Zhou et al. |
| 2014/0143405 A1 | 5/2014 | Pavlidis et al. |
| 2014/0180809 A1 * | 6/2014 | Boal .................. G06Q 30/0269 |
| | | 705/14.49 |
| 2014/0244361 A1 | 8/2014 | Zhang et al. |
| 2014/0244479 A1 | 8/2014 | White et al. |
| 2014/0245210 A1 | 8/2014 | Battcher et al. |
| 2014/0358766 A1 | 12/2014 | Nayyar et al. |
| 2015/0026035 A1 | 1/2015 | Showalter |
| 2015/0095210 A1 | 4/2015 | Grech et al. |
| 2015/0149333 A1 | 5/2015 | Yaplee et al. |
| 2015/0161606 A1 | 6/2015 | Lee |
| 2015/0168478 A1 | 6/2015 | Ohlen et al. |
| 2015/0254768 A1 | 9/2015 | Menon et al. |
| 2015/0269578 A1 | 9/2015 | Subramanian et al. |
| 2016/0019614 A1 | 1/2016 | Dziuk |
| 2016/0055427 A1 | 2/2016 | Adjauote |
| 2016/0210634 A1 | 7/2016 | Trujillo |
| 2017/0213282 A1 | 7/2017 | Dziuk |
| 2019/0333144 A1 | 10/2019 | Frohwein et al. |

OTHER PUBLICATIONS

Barr, A., "Update 5—Amazon offering loans to its on line sellers," www.reuters.com, dated Sep. 27, 2012, Retrieved from the Internet URL: http://www.reuters.com/article/amazon-lending-idUSL1E8KRA1020120927?type=companyNews, on Jun. 1, 2017, pp. 1-4.

Giusti, A.C., "Want More Revenue? Enhance The Offers: Carefully matching merchants with the right products and ensuring agents know them well can dictate how much an ISO may earn from value-added services," ISO & Agent 7.4, dated May 1, 2011, pp. 1-2.

Leung, L., "PayPal ramps up small-business loans," The Orange County register, Journal—Gazette [Ft. Wayne, Ind], dated Feb. 10, 2014, pp. 1-2.

Proquest, "Intuit Launches New Personalizable Small Business Channel on Quicken.com Web Site", Business/Technology Editors, Business Wire New York, Jul. 1998, pp. 1-3.

"Merchant Financing System Cash Advance", Google Search, dated Apr. 5, 2022, pp. 1-2.

"Search Strategy From Dialog", Scientific and Technical Information Center, ProQuest, dated Apr. 6, 2022, pp. 1-4.

EIC Search Report, STIC, Completed on Apr. 14, 2022, 25 pages.

Non-Final Office Action mailed on Jan. 8, 2015, for U.S. Appl. No. 14/491,958, of Poursartip, A., et al., filed Sep. 19, 2014.

Non-Final Office Action mailed on Mar. 27, 2015, for U.S. Appl. No. 14/491,965, of Poursartip, A., et al., filed Sep. 19, 2014.

Non-Final Office Action mailed on Mar. 27, 2015, for U.S. Appl. No. 14/491,967, of Poursartip, A., et al., filed Sep. 19, 2014.

(56) References Cited

OTHER PUBLICATIONS

Final Office Action mailed on May 20, 2015, for U.S. Appl. No. 14/491,958, of Poursartip, A., et al., filed Sep. 19, 2014.
Advisory Action mailed on Jul. 27, 2015, for U.S. Appl. No. 14/491,958, of Poursartip, A., et al., filed Sep. 19, 2014.
Non-Final Office Action mailed on Aug. 27, 2015, for U.S. Appl. No. 14/540,947, of Baker, G. K., et al., filed Nov. 13, 2014.
Final Office Action mailed on Oct. 8, 2015, for U.S. Appl. No. 14/491,967, of Poursartip, A., et al., filed Sep. 19, 2014.
Final Office Action mailed on Nov. 6, 2015, for U.S. Appl. No. 14/491,965, of Poursartip, A., et al., filed Sep. 19, 2014.
Non-Final Office Action mailed on Jan. 5, 2016, for U.S. Appl. No. 14/491,958, of Poursartip, A., et al., filed Sep. 19, 2014.
Non-Final Office Action mailed on Feb. 12, 2016, for U.S. Appl. No. 14/540,947, of Baker, G. K., et al., filed Nov. 13, 2014.
Non-Final Office Action mailed Sep. 9, 2016, for U.S. Appl. No. 14/540,947, of Baker, G. K., filed Nov. 13, 2014.
Non-Final Office Action mailed on May 5, 2016, for U.S. Appl. No. 14/491,967, of Poursartip, A., et al., filed Sep. 19, 2014.
Non-Final Office Action mailed on Jun. 17, 2016, for U.S. Appl. No. 14/491,965, of Poursartip, A., et al., filed Sep. 19, 2014.
Non-Final Office Action mailed on Jun. 17, 2016, for U.S. Appl. No. 14/622,605, of Scott, J.B., et al., filed Feb. 13, 2015.
Final Office Action mailed Oct. 21, 2016, for U.S. Appl. No. 14/491,967, of Poursartip, A., et al., filed Sep. 19, 2014.
Non-Final Office Action mailed Nov. 28, 2016, for U.S. Appl. No. 14/491,963, of Poursartip, A., et al., filed Sep. 19, 2014.
Non-Final Office Action mailed Dec. 19, 2016, for U.S. Appl. No. 14/491,965, of Poursartip, A., et al., filed Sep. 19, 2014.
Examiner's Answer to Appeal Brief mailed Jan. 27, 2017, for U.S. Appl. No. 14/491,958, of Poursartip, A., et al., filed Sep. 19, 2014.
Non-Final Office Action mailed Feb. 10, 2017, for U.S. Appl. No. 14/622,605, of Scott, J.B., et al., filed Feb. 13, 2015.
Notice of Allowance mailed Mar. 30, 2017, for U.S. Appl. No. 14/491,967, of Poursartip, A., et al., filed Sep. 19, 2014.
Final Office Action mailed on Apr. 6, 2017, for U.S. Appl. No. 14/540,947, of Baker, G.K., filed Nov. 13, 2014.
Non-Final Office Action mailed May 10, 2017, for U.S. Appl. No. 14/602,486, of Fern, A.J., et al., filed Jan. 22, 2015.
Non-Final Office Action mailed May 16, 2017, for U.S. Appl. No. 14/676,678, of Scott, J.B., et al., filed Apr. 1, 2015.
Notice of Allowance mailed Jun. 7, 2017, for U.S. Appl. No. 14/491,963, of Poursartip, A., et al., filed Sep. 19, 2014.
Notice of Allowance mailed Jun. 22, 2017, for U.S. Appl. No. 14/540,947, of Baker, G.K., filed Nov. 13, 2014.
Final Office Action mailed Jul. 27, 2017, for U.S. Appl. No. 14/491,965, of Poursartip, A., et al., filed Sep. 19, 2014.
Notice of Allowance mailed Sep. 22, 2017, for U.S. Appl. No. 14/622,605, of Scott, J.B., et al., filed Feb. 13, 2015.
Non-Final Office Action mailed Nov. 8, 2017, for U.S. Appl. No. 15/725,591, of Poursartip, A., et al., filed Oct. 5, 2017.
Final Office Action mailed Dec. 29, 2017, for U.S. Appl. No. 14/676,678, of Scott, J.B., et al., filed Apr. 1, 2015.
Final Office Action mailed Jan. 9, 2018, for U.S. Appl. No. 14/602,486, of Fern, A.J., et al., filed Jan. 22, 2015.
Notice of Allowance mailed Jan. 19, 2018, for U.S. Appl. No. 14/491,965, of Poursartip, A., et al., filed Sep. 19, 2014.
Notice of Allowance mailed May 2, 2018, for U.S. Appl. No. 15/725,591, of Poursartip, A., et al., filed Oct. 5, 2017.
Non-Final Office Action mailed Oct. 5, 2018, for U.S. Appl. No. 16/111,278, of Poursartip, A., et al., filed Aug. 24, 2018.
Non-Final Office Action mailed Oct. 18, 2018, for U.S. Appl. No. 14/676,678, of Scott, J.B., et al., filed Apr. 1, 2015.
Non Final Office Action mailed Jan. 25, 2019, for U.S. Appl. No. 14/602,486, of Fern, A.J., et al., filed Jan. 22, 2015.
Notice of Allowance mailed Feb. 21, 2019, for U.S. Appl. No. 16/111,278, of Poursartip, A., et al., filed Aug. 24, 2018.
Non Final Office Action mailed May 31, 2019, for U.S. Appl. No. 15/670,305, of Poursartip, A., et al., filed Aug. 7, 2017.
Notice of Allowance mailed Jun. 4, 2019, for U.S. Appl. No. 14/491,958, of Poursartip, A., et al., filed Sep. 19, 2014.
Notice of Allowance mailed Jun. 12, 2019, for U.S. Appl. No. 14/676,678 of Scott, J.B., et al., filed Apr. 1, 2015.
Final Office Action mailed Aug. 2, 2019, for U.S. Appl. No. 14/602,486, of Fern, A.J., et al., filed Jan. 22, 2015.
Pre-Interview First Office Action mailed Feb. 19, 2021, for U.S. Appl. No. 16/658,198, of Scott, J.B et al., filed Oct. 21, 2019.
Final Office Action mailed Mar. 1, 2021, for U.S. Appl. No. 16/808,860, of Poursartip, A., et al., filed Mar. 4, 2020.
Notice of Allowance mailed Oct. 31, 2019, for U.S. Appl. No. 15/670,305, of Poursartip, A., et al., filed Aug. 7, 2017.
Non-Final Office Action mailed Mar. 18, 2020, for U.S. Appl. No. 14/602,486, of Cieri, M.M, et al., filed Oct. 23, 2014.
Non-Final Office Action malled Sep. 29, 2020, for U.S. Appl. No. 16/808,860, of Poursartip, A., et al., filed Mar. 4, 2020.
Notice of Allowance mailed Sep. 17, 2020, for U.S. Appl. No. 14/602,486, of Fern A., A et al., filed Jan. 22, 2015.
Pre-Interview First Office Action mailed Apr. 5, 2021, for U.S. Appl. No. 16/596,903, of Poursartip, A., et al., filed Oct. 9, 2019.
Notice of Allowance mailed Apr. 21, 2021, for U.S. Appl. No. 16/808,860, of Poursartip, A., et al., filed Mar. 4, 2020.
First Action Interview Office Action mailed Jun. 17, 2021, for U.S. Appl. No. 16/596,903, of Poursartip, A., et al., filed Oct. 9, 2019.
Final Office Action mailed Aug. 19, 2021, for U.S. Appl. No. 16/658,198, of Scott, J.B et al., filed Oct. 21, 2019.
Final Office Action mailed Dec. 30, 2021, for U.S. Appl. No. 16/596,903, of Poursartip, A., et al., filed Oct. 09. 2019.
Notice of Allowance mailed Feb. 24, 2022, for U.S. Appl. No. 16/658,198, of Scott, J.B et al., filed Oct. 21, 2019.
Advisory Action mailed Mar. 9, 2022, for U.S. Appl. No. 16/596,903, of Poursartip, A., et al., filed Oct. 9, 2019.
Non-Final Office Action mailed Apr. 11, 2022, for U.S. Appl. No. 16/596,903, of Poursartip, A., et al., filed Oct. 9, 2019.
Notice of Allowance mailed Jun. 20, 2022, for U.S. Appl. No. 16/596,903, of Poursartip, A., et al., filed Oct. 9, 2019.
Non-Final Office Action malled Jun. 9, 2022, for U.S. Appl. No. 17/154,028, of Fem, A. D., et al., filed Jan. 21, 2021.
Supplemental Notice of Allowance mailed Jul. 7, 2022, for U.S. Appl. No. 16/596,903, of Poursartip, A., et al., filed Oct. 9, 2019.
Non-Final Office Action mailed Oct. 27, 2022, for U.S. Appl. No. 17/407,314, of Poursartip, A., et al., filed Aug. 20, 2021.
Notice of Allowance mailed Nov. 1, 2022, for U.S. Appl. No. 17/154,028, of Fern, A. D., et al., filed Jan. 21, 2021.

\* cited by examiner

CLASSIFIER PERFORMING ELIGIBILITY DETERMINATION

CROSS-REFERENCES TO RELATED APPLICATIONS

This application is a continuation of, and claims priority to, U.S. patent application Ser. No. 16/596,903, filed Oct. 9, 2019, issued as U.S. Pat. No. 11,481,839, which is a continuation of, and claims priority to, U.S. patent application Ser. No. 14/491,958, filed Sep. 19, 2014, issued as U.S. Pat. No. 10,445,826, which claims the benefit of U.S. Provisional Patent Application No. 62/003,000, filed on May 26, 2014, and all of which are incorporated by reference herein.

BACKGROUND

Individuals and businesses can approach financial institutions, e.g., banks, to request funds for various purposes. When requesting funds, an individual will typically fill out an application that provides the bank with the individual's personal and financial information. The bank will then evaluate the individual's application to make a decision on whether to approve the funds.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
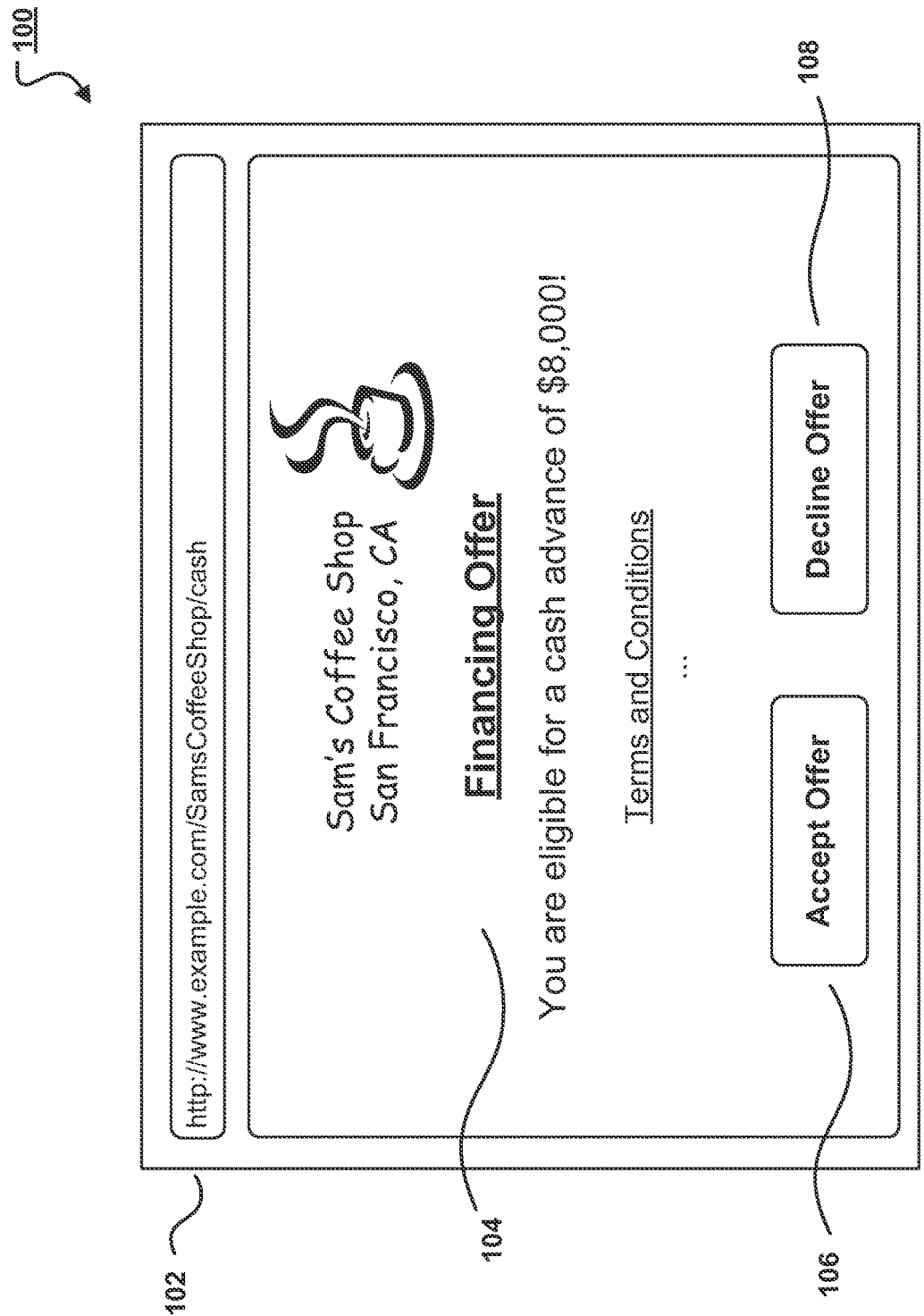
FIG. 1 illustrates an example view of an interface for offering financing to a merchant.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Systems and methods in accordance with various embodiments of the present disclosure overcome one or more of the above-referenced and other deficiencies in conventional approaches to providing financing, e.g., cash advances, to merchants. In particular, various embodiments of the present disclosure can provide a method for evaluating financial transactions conducted by a merchant through a payment system and, based on the evaluation, providing the merchant with one or more offers of cash advances. The determination of whether a merchant qualifies for a financing offer can be based entirely on an evaluation of the merchant's previously conducted financial transactions through the payment system. In other words, the merchant need not complete applications for requesting the cash advance or provide a credit check. For example, over the previous year, the merchant may have conducted financial transactions through the payment system that total $100,000 in payment volume. Based on this payment volume and various other factors associated with the merchant, a determination can be made to offer the merchant a cash advance of $8,000 and an $800 fee for the cash advance being offered.

Thus, the merchant would receive a cash advance of $8,000 and would have to pay back the merchant financing system, e.g., the payment system, a total amount of $8,800, i.e., the $8,000 cash advance and the $800 fee. This amount can be collected by the payment system as a fraction of the amounts collected by the merchant from future financial transactions conducted through the payment system. To accept the offer, the merchant can select an option, for example, through a financing interface provided by the payment system. Once the offer is accepted, the merchant can be provided the cash advance through an electronic deposit made by the payment system in a financial account of the merchant in a financial institution.

After the cash advance is disbursed, each time the merchant conducts a financial transaction through the payment system, the payment system will deduct a specified percentage, e.g., 10 percent, from the amount charged in the financial transaction. For example, if the merchant conducts a financial transaction in the amount of $50.00, then, while processing the financial transaction, the payment system will automatically deduct $5.00, and apply that amount to the amount owed by the merchant, i.e., $8,800. In other words, at a rate of 10 percent, the merchant will be done repaying the amount owed once the merchant has reached $88,000 in financial transactions conducted through the payment system. In some embodiments, the payment system can be configured to deduct the rate of repayment, e.g., 10 percent, from a group of financial transactions conducted by the merchant through the payment system over a particular period of time, e.g., daily, weekly, bi-weekly, monthly, or yearly.

The approaches described in this specification can allow merchants to obtain financing without having to go through a typical loan application process. Merchants can also obtain financing in a timelier manner than having to fill out loan applications and obtain funding upon successful completion of the loan process. Other advantages, variations, and functions are described and suggested below as may be provided in accordance with the various embodiments.

FIG. 1 illustrates an example view 100 of an interface 102 for offering financing to a merchant. The interface 102 is a graphical user interface that can be displayed on a display screen of a computing device that is being operated by a merchant ("Sam's Coffee Shop"). For example, the computing device, e.g., the merchant device 304, can present the interface 102 through an application, e.g., a web browser or a merchant application, that is running on the computing device.

Some of the information presented in the interface 102 can be generated by a merchant financing system, e.g., the merchant financing system 308. The merchant financing system is configured to determine whether the merchant qualifies for a financing offer, e.g., a cash advance, by evaluating various factors associated with the merchant, as described below. Some of these factors can be based, in part, on evaluating financial transactions conducted by the merchant through a payment system, e.g., the payment system 312, as described in reference to FIG. 3. As described below, the payment system is configured to process financial transactions between merchants and their customers. These financial transactions can be, for example, cardless payment transactions or transactions performed using financial payment instruments, e.g., credit cards, debit cards, or gift cards, to name some examples.

Once a determination is made that the merchant pre-qualifies for a financing offer, the details of the financing offer can be sent to the merchant. Depending on the implementation, the offer details can be sent to the computing device over a network, e.g., the Internet, through a web-based environment or may be sent to the merchant through electronic communication, e.g., by e-mail or a text message.

After receiving notification of the offer, the merchant can interact with the computing device, e.g., the merchant device 304, to access the interface 102 and learn more about the offer details. For example, the interface 102 may be accessible to the merchant over the Internet and through a secure Uniform Resource Locator (URL). In this example, the merchant can access the URL through a web browser to learn more about the financing offer. Similarly, the interface 102 may be accessible to the merchant through a software application, e.g., the merchant application, that is running on the computing device.

The interface 102 provides the merchant with information about the financing offer. For example, the interface 102 can provide an amount of financing 104 that is being offered to the merchant. As mentioned, this amount can be determined based in part on evaluating the merchant's previous financial transactions that were processed through the payment system. For example, the merchant financing system may determine that the merchant qualifies for a cash advance of $8,000. This offer can be presented to the merchant through the interface 102. The merchant financing system may also determine various terms and conditions for the offer. For example, the terms and conditions may specify that the merchant financing system will provide the merchant a cash advance of $8,000 and, in return, the merchant agrees to pay the merchant financing system a fee, e.g., a fixed fee of $1,000. Details regarding the repayment of the fee can also be provided in the terms and conditions.

The merchant can decide to accept or reject the financial offer by selecting an accept option 106 or a decline option 108, respectively. Once the accept option 106 is selected, in various embodiments, the merchant is provided the cash advance through an electronic deposit made by the payment system to the merchant's account with a financial institution. Other approaches to providing the merchant with the cash advance are possible including, for example, providing the merchant with a financial payment card having a pre-set spending limit in the amount of the cash advance.

In various embodiments, to charge the merchant for the cash advance amount and the fee, the payment system is configured to deduct a portion of the merchant's earnings from future sales, i.e., sales conducted through the payment system after acceptance of the financing offer, until the cash advance amount and the fee are repaid. For example, when the merchant conducts a financial transaction through the payment system, the payment system can deduct 10 percent from the amount collected by the merchant from the financial transaction. Depending on the implementation, the payment system can automatically deduct the 10 percent on a per transaction basis, e.g., 10 percent is deducted from each financial transaction conducted by the merchant, until the fee is repaid to the merchant financing system. In some embodiments, the payment system automatically deducts 10 percent from a total amount collected by the merchant for financial transactions conducted by the merchant over a certain time period, e.g., hourly, daily, weekly, bi-weekly, monthly, or yearly. Typically, there is no set time period for repayment of the fee. However, a time period for repayment may be specified in the terms and conditions. Naturally, once the fee has been repaid to the merchant financing system, the payment system no longer deducts a portion of the merchant's earnings from its financial transactions.

Figure 2:
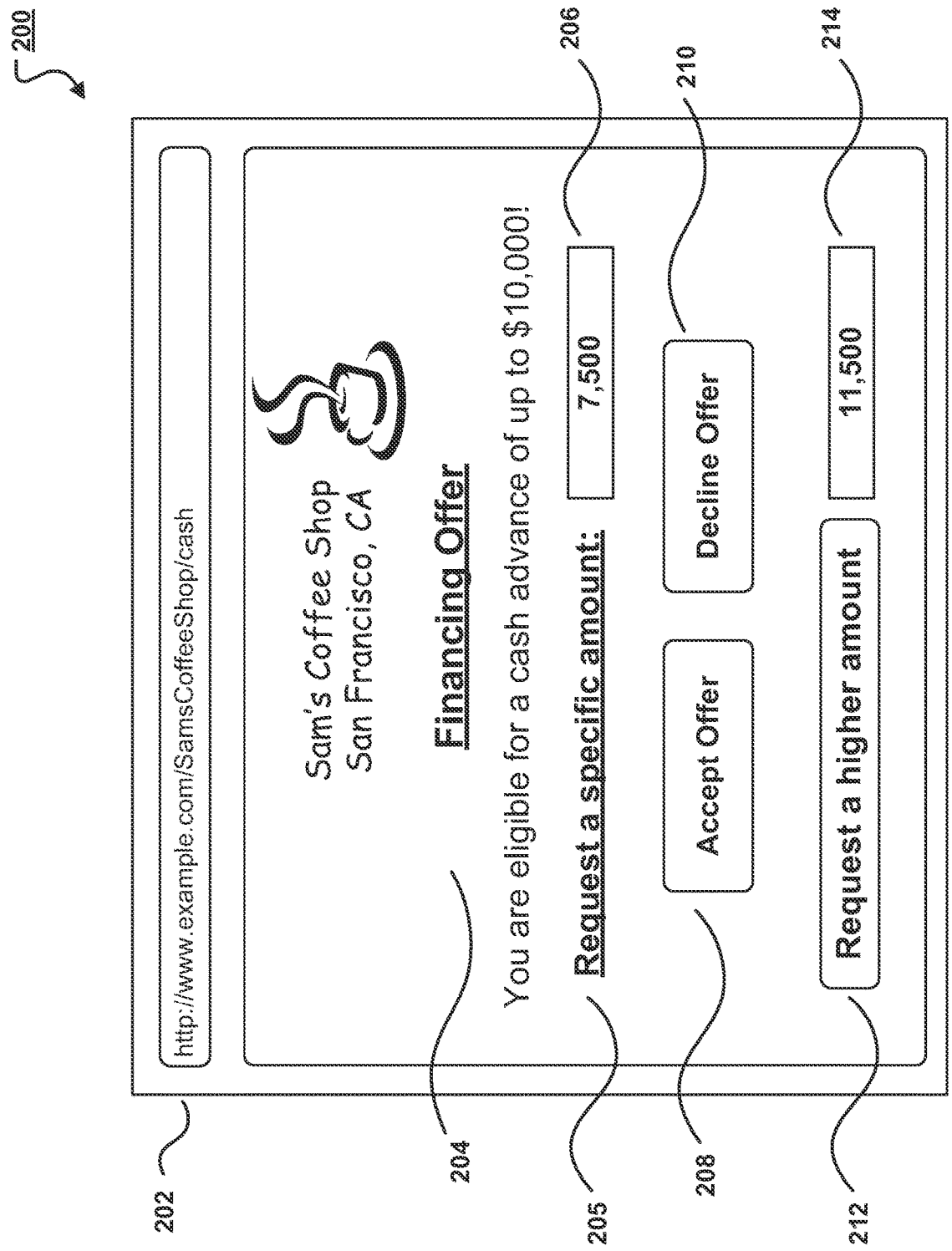
FIG. 2 illustrates another example view of an interface for offering financing to a merchant.

FIG. 2 illustrates another example view 200 of an interface 202 for offering financing to a merchant. The interface 202 is a graphical user interface that can be displayed on a display screen of a computing device that is being operated by a merchant ("Sam's Coffee Shop"). For example, the computing device, e.g., the merchant device 204, can present the interface 202 through an application, e.g., a web browser or a merchant application, that is running on the computing device.

The interface 202 contains information that can be generated by the merchant financing system, e.g., the merchant financing system 308, using the approaches described in this specification. As described above, the merchant financing system is configured to determine whether the merchant qualifies for a financing offer, e.g., a cash advance, by evaluating various factors associated with the merchant. Once a determination is made that the merchant qualifies for a financing offer, the details of the financing offer can be sent to the merchant, as described above.

After receiving notification of the offer, the merchant can interact with the computing device, e.g., the merchant device 304, to access the interface 202 and learn more about the offer details. For example, the interface 202 may be accessible to the merchant over the Internet and through a secure Uniform Resource Locator (URL). In this example, the merchant can access the URL through a web browser to learn more about the financing offer. Similarly, the interface 202 may be accessible to the merchant through a software application, e.g., the merchant application, that is running on the computing device.

The interface 202 provides the merchant with information about the financing offer. In some embodiments, this information includes a maximum amount 204 of financing that the merchant is pre-qualified to receive. As discussed, this amount can be determined based in part on evaluating the merchant's financial transactions that were processed through the payment system. For example, the merchant financing system may determine that the merchant qualifies for a cash advance of up to $10,000. This information can be presented to the merchant through the interface 202. In some embodiments, the merchant can simply select the accept option 208 to receive the entire amount of financing that the merchant is pre-qualified to receive.

In some instances, the merchant may not need the entire amount of financing being offered. Thus, in some embodiments, the merchant can request a specific amount of financing, e.g., $7,500, by inputting an amount of financing of up to the maximum amount being offered in an input field 206. Once inputted, the merchant financing system can provide adjusted terms and conditions with adjusted repayment details to be presented in the interface 202, including, for example, the amount of fee to be charged for the requested cash advance and percentage to be deducted from the merchant's financial transactions for repayment of that fee. If these adjusted terms and conditions, together with the repayment details, are agreeable to the merchant, then the merchant can select the accept option 208 button to accept the financing offer. In response, the merchant financing system can instruct the payment system to deposit the requested amount in the merchant's account with a financial institution. Other approaches to providing the requested amount can also be used, as described in this specification. As described above, the merchant financing system can instruct the payment system to deduct a portion of the merchant's earnings from future sales until the fee is repaid to the merchant financing system.

In some embodiments, the merchant can select an option 212 to request an amount of financing that is higher than the amount being offered. The merchant can input the higher requested amount in an input field 214. This requested amount can be provided to the merchant financing system, which can then evaluate various factors, e.g., the merchant's financial transaction history, to determine whether the merchant qualifies for the requested amount. If the merchant financing system approves the merchant's request for the higher amount of financing, adjusted terms and conditions for the higher amount can be presented in the interface 202, including, for example, an adjusted fee for the financing, an adjusted percentage to be deducted from financial transactions performed by the merchant, whether the deductions are done on a per-transaction basis or from financial transactions conducted by the merchant over a certain time period, e.g., hourly, daily, weekly, bi-weekly, monthly, or yearly. The adjusted terms may also specify a new time period for repayment may be specified in the terms and conditions. If these adjusted terms and conditions are agreeable to the merchant, then the merchant can select the accept option 208 button to accept the financing offer for the higher amount. In response, the merchant financing system can instruct the payment system to deposit the requested higher amount in the merchant's account with a financial institution. Other approaches to providing the requested amount can also be used, as described in this specification. As described above, the merchant financing system can instruct the payment system to deduct a portion of the merchant's earnings from future sales until the fee is repaid to the merchant financing system.

Figure 3:
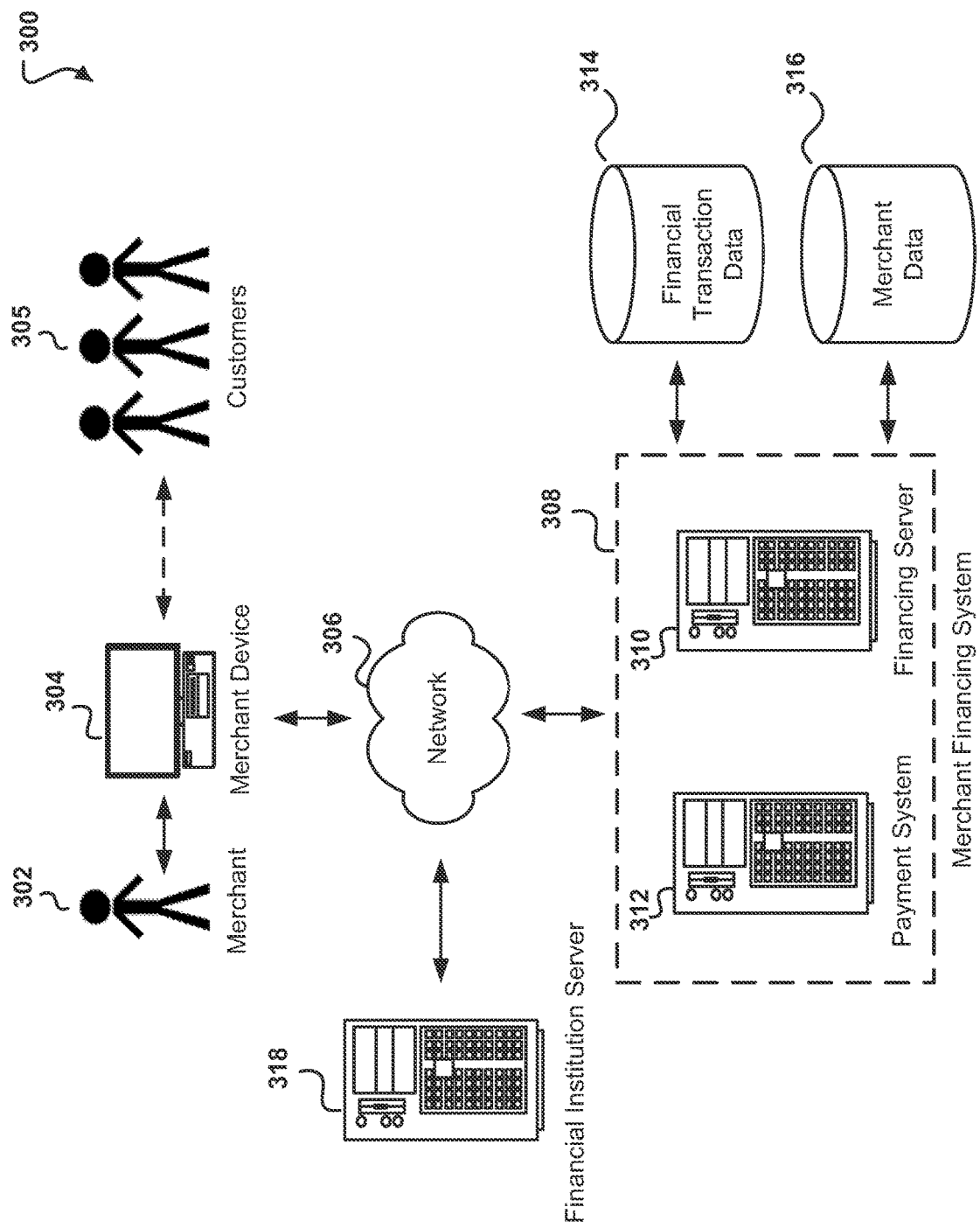
FIG. 3 illustrates an example of an environment for implementing a merchant financing system.

FIG. 3 illustrates an example of an environment 300 for implementing a merchant financing system 308. The exemplary environment 300 includes a merchant financing system 308. The merchant financing system 308 includes a financing server 310 and a payment system 312.

The financing server 310 can be implemented as computer programs on one or more computers in one or more locations, in which the systems, components, and techniques described in this specification can be implemented. The payment system 312 is configured to process financial transactions between the merchant 302 and its customers 305. These financial transactions can be, for example, cardless payment transactions or transactions performed using financial payment instruments, e.g., credit cards, debit cards, or gift cards, to name some examples. Further operation of the payment system 312 is described below in reference to FIG. 5. The example environment 300 also includes a merchant computing device 304 that can be used to conduct financial transactions, as described below in reference to FIG. 5.

The merchant device 304 can be a computer coupled to the merchant financing system 308 through a data communication network 306, e.g., the Internet. The merchant device 304 generally includes a memory, e.g., a random access memory (RAM), for storing instructions and data, and a processor for executing stored instructions. The merchant device 304 can include one or more components, e.g., software or hardware, that are operable to send and receive requests, messages, or other types of information over the network 306. Some examples of computing devices include personal computers, cellular phones, handheld messaging devices, laptop computers, personal data assistants, tablet devices, and the like.

The network 306 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The merchant device 304, and the merchant financing system 308 can communicate over the network 306 using wired or wireless connections, and combinations thereof.

The financing server 310 is configured to determine whether a merchant qualifies for a financing offer, e.g., a cash advance, by evaluating various factors associated with the merchant. Some of these factors can be based, in part, on evaluating financial transactions conducted by the merchant through the payment system 312.

The financing server 310 can determine whether a merchant is eligible for a financing offer, the amount of the cash advance, a fee for the cash advance, e.g., a percentage of the cash advance or a fixed fee, and a rate for repayment for the cash advance and the fee, i.e., a fixed amount or a percentage, to be deducted from financial transactions conducted by the merchant. These determinations can be made, for example, by applying various machine learning techniques, e.g., ensemble learning methods.

In various embodiments, the financial server 310 utilizes a classifier, for example, based on a random forest approach, to determine whether a merchant qualifies for a financing offer. The classifier can be trained using training data that describes, for various merchants, respective payment history, the respective type of business, a respective gross payment volume (GPV) over a particular time period, the growth of the merchant's GPV over a particular time period, e.g., month over month growth, and whether the merchant has a brick-and-mortar store, to name some examples.

To determine whether a particular merchant qualifies for a financing offer, the financing server 310 can utilize the classifier to determine whether factors describing the merchant qualify the merchant for a cash advance. As mentioned, these factors can be, for example, the merchant's payment history, the type of business, and a GPV over a particular time period, e.g., over the past fiscal quarter or year. The financing server 310 can also determine the amount of the financing offer, the fee for the financing offer, and the rate of repayment, using similar techniques. For example, the financing server 310 can apply normal regression analysis on the merchant's previous financial transactions conducted by the merchant through the payment system 312 to make such determinations. In some embodiments, the fee for the cash advance is based on a specified percentage, e.g., 14 percent, of the cash advance. In some embodiments, the rate of repayment is a specified percentage, e.g., 10 percent. In some embodiments, the rate is determined based on targeting a 10-month repayment model. This model can be determined by forecasting the merchant's GPV for the subsequent year.

Once the financing server 310 determines that the merchant qualifies for a financing offer, the details of the financing offer can be sent to the merchant. Depending on the implementation, the offer details can be sent to the computing device over a network, e.g., the Internet, through a web-based environment, as described above, or may be sent to the merchant through electronic communication, e.g., by e-mail or a text message.

The merchant can then accept the financing offer, as described above. Once the offer is accepted, the financing server 310 can instruct the payment system 312 to disburse funds, to the merchant, in the amount specified in the offer. The payment system 312 can access various merchant data 316 that describes financial account information, e.g., a routing number for a checking account, for the merchant. In some embodiments, the payment system 312 electronically deposits the funds in the merchant's financial account with a financial institution 318. The merchant can then access the funds directly from their financial account. Other approaches to providing the merchant with the cash advance are possible including, for example, providing the merchant with a financial payment card having a pre-set spending limit in the amount of the cash advance.

The payment system 312 is configured to process financial transactions between the merchant 302 and customers 305, as described below in reference to FIG. 5. In various embodiments, while processing financial transactions for the merchant 302, the payment system 312 is also configured to deduct a portion of the merchant's earnings from these financial transactions until the amount of financing provided to the merchant, together with the fee for the financing, is collected by the payment system 312. As mentioned, the amount deducted from financial transactions can be based on a rate for repayment for the cash advance and the fee, as specified in the terms and conditions, i.e., a fixed amount deducted from each transaction, e.g., $5, or a percentage, e.g., 10 percent, to be deducted from financial transactions conducted by the merchant. As mentioned, these deductions can be performed on a per-transaction basis or from financial transactions conducted by the merchant over a certain time period, e.g., hourly, daily, weekly, bi-weekly, monthly, or yearly.

In some embodiments, the financing server 310 may determine that the merchant qualifies up to a maximum amount of financing. In such embodiments, the merchant can request an amount of financing that is the same or less than the maximum amount of financing. In some embodiments, the merchant may request an amount of financing that is higher than the amount of financing that the merchant was pre-qualified to receive. In such embodiments, the financing server 310, alone or in combination with human feedback, can evaluate the request to determine whether the merchant should receive the requested higher amount of financing.

The financing server 310 is configured to evaluate respective factors associated with merchants, as described above, to determine whether any of those merchants pre-qualify for respective financing offers. Naturally, the factors for each merchant will vary based on the different types of financial transactions performed by that merchant and the various attributes of the merchant. Thus, the financing server 310 is able to generate custom financing offers for each merchant. Financing offers for each merchant can be determined automatically without merchants necessarily requesting such offers. Once determined, these offers can be provided to the merchants, as described above, without the merchant having to request the cash advance.

Figure 4:
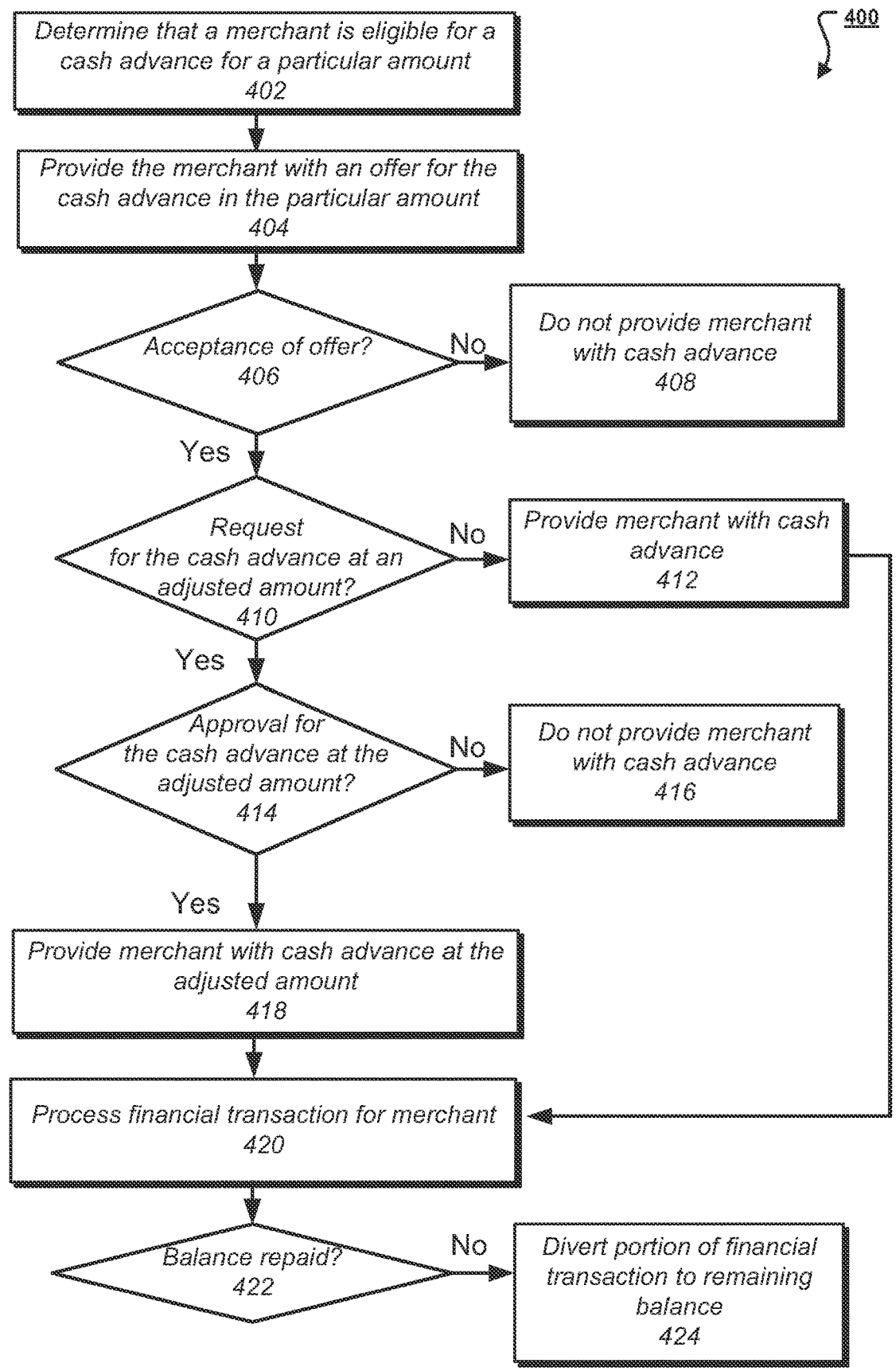
FIG. 4 illustrates an example process for providing merchant financing.

FIG. 4 illustrates an example process for providing merchant financing. The example process 400 is provided merely as an example and additional or fewer steps may be performed in similar or alternative orders, or in parallel, within the scope of the various embodiments described in this specification. A computing system, e.g., the merchant financing system 308, as described in reference to FIG. 3, determines that a merchant is eligible for a cash advance for a particular amount 402. The computing system can provide the merchant with an offer for the cash advance for the particular amount, for example, through an e-mail or text 404.

The merchant can accept or reject the offer for the cash advance, as described above 406. If the merchant rejects the offer, then the computing system does not provide the merchant with the cash advance in the particular amount 408. However, if the merchant accepts the offer, a determination can be made whether the merchant is requesting the cash advance at a different amount than the offered particular amount 410. If the merchant has accepted the offer for the cash advance at the particular amount, then the computing system can provide the merchant with the cash advance 412. The merchant can then start processing financial transactions through the merchant financing system 420, as described below.

However, if the merchant is requesting the cash advance at an adjusted amount, for example, a higher amount or a lesser amount, then a determination can be made if providing the cash advance at the adjusted amount is approved 414. If the computing system determines that providing the merchant with the cash advance at the adjusted amount is not approved, then the computing system does not provide the merchant with the cash advance 416. In such instances, the computing system can provide the merchant with a message indicating that a cash advance at the requested amount is not approved. If, however, the computing system determines that providing the merchant with the cash advance at the adjusted amount is approved, then the computing system provides the merchant with the cash advance 418.

After receiving the cash advance, the merchant can process financial transactions through the merchant financing system 420. When processing a financial transaction, the merchant financing system can determine whether the merchant still needs to repay the remaining balance for the cash advance and fee. If the balance still needs to be repaid, then a portion of funds are diverted from the financial transaction to the merchant financing system 424. The amount of the portion of funds can be determined based on the rate for repayment for the cash advance and the fee. If the merchant has already repaid the remaining balance for cash advance and the fee, then no funds are diverted and the merchant can continue processing financial transactions normally 420.

Figure 5:
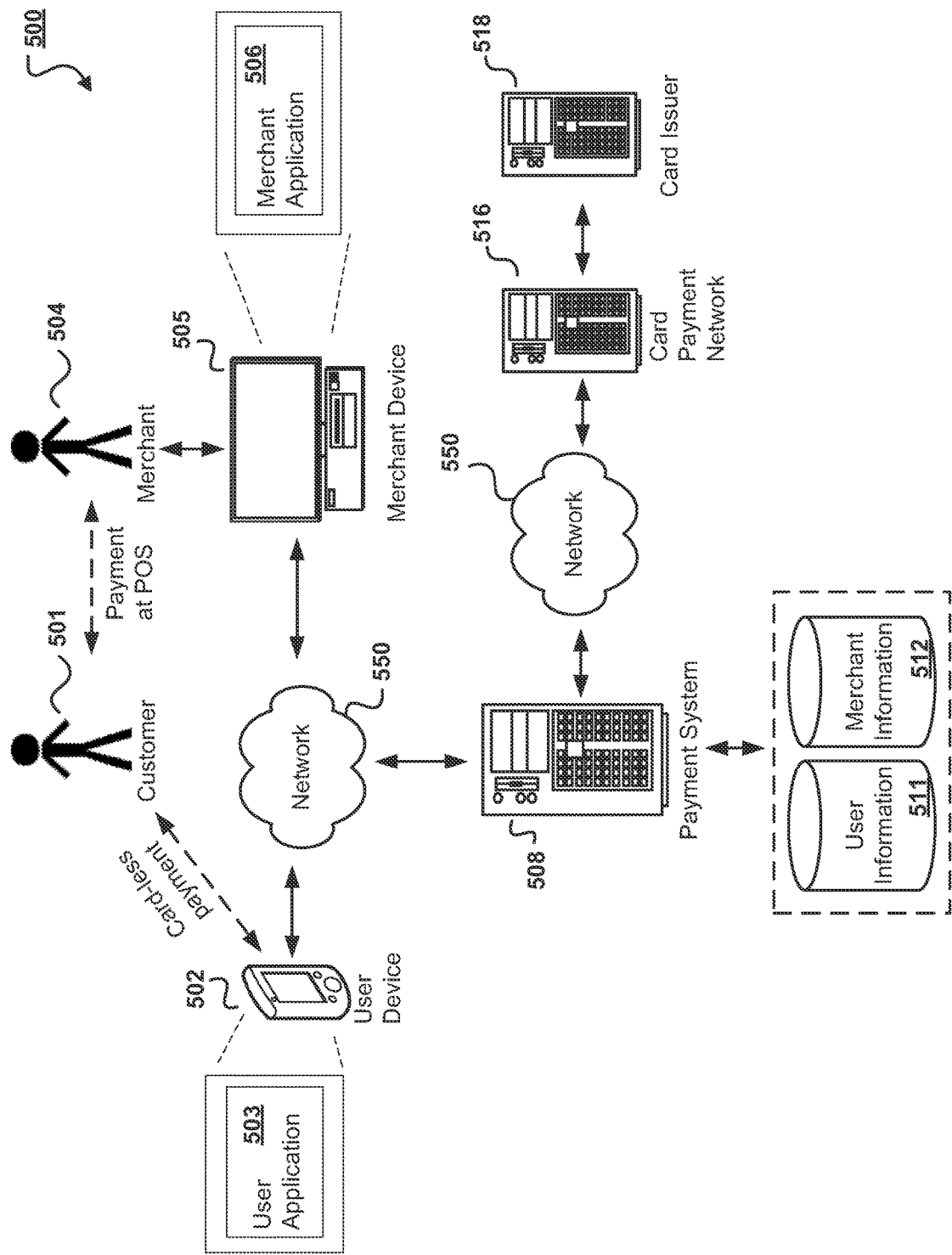
FIG. 5 illustrates an example of an environment for implementing a payment system.

FIG. 5 illustrates an example of an environment 500 for implementing a payment system 508. Although a mobile device environment is described for purposes of explanation, different environments may be used, e.g., a web-based environment, to implement various embodiments.

The example environment 500 includes a payment system 508, e.g., the payment system 312, as described above, which can be implemented as computer programs on one or more computers in one or more locations, in which the systems, components, and techniques described below can be implemented. The example environment 500 also includes a user device 502 and a merchant device 505.

The user device 502 and the merchant device 505 can each be a computer coupled to the payment system 508 through a data communication network 550, e.g., the Internet. The user device 502 and the merchant device 505 each generally include a memory, e.g., a random access memory (RAM), for storing instructions and data, and a processor for executing stored instructions. The user device 502 and the merchant device 505 can each include one or more components, e.g., software or hardware, that are configured to respectively determine a geographic location of the user device 502 or the merchant device 505, using, for example, various geolocation techniques, e.g., a global positioning system (GPS). Further, the user device 502 and the merchant device 505 can each be any appropriate device operable to send and receive requests, messages, or other types of information over the network 550. Some examples of user devices include personal computers, cellular phones, handheld messaging devices, laptop computers, personal data assistants, tablet devices, and the like.

The network 550 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system 508, the merchant device 505, and the user device 502 can communicate over the network using wired or wireless connections, and combinations thereof.

As used in this specification, a financial transaction is a transaction that is conducted between a customer 501 and a merchant 504 at a point-of-sale. When paying for a financial transaction, the customer 501 can provide the merchant 504 with cash, a check, or credit card for the amount that is due. The merchant 504 can interact with a point-of-sale device, e.g., merchant device 505, to process the financial transaction. During financial transactions, the point-of-sale device can collect data describing the financial transaction, including, for example, the amount of payment received from customers.

In some implementations, the payment system 508 is configured to accept card-less payment transactions from customers, e.g., the customer 501. As used in this specification, a card-less payment transaction is a transaction conducted between the customer 501 and a merchant 504 at the point-of-sale during which a financial account of the customer 501 is charged without the customer 501 having to physically present a financial payment card to the merchant 504 at the point-of-sale. That is, the merchant 504 need not receive any details about the financial account, e.g., the credit card issuer or credit card number, for the transaction to be processed.

Before conducting card-less payment transactions, the customer 501 typically creates a user account with the payment system 508. The customer 501 can create the user account, for example, by interacting with a user application 503 that is configured to perform card-less payment transactions and that is running on the user device 502. When creating a user account with the payment system 508, the customer 501 will provide portrait of the customer 501, data describing a financial account of the customer 501, e.g., credit card number, expiration date, and a billing address. This user information can be securely stored by the payment system 508, for example, in a user information database 511. To accept card-less payment transactions, the merchant 504 typically creates a merchant account with the payment system 508 by providing information describing the merchant including, for example, a merchant name, contact information, e.g., telephone numbers, the merchant's geographic location address, and one or more financial accounts to which funds collected from users will be deposited. This merchant information can be securely stored by the payment system 508, for example, in a merchant information database 512.

The payment system 508 is configured to perform card-less payment transactions. The payment system 508 can include one or more servers that are configured to securely perform electronic financial transactions, e.g., electronic payment transactions, between a customer and a merchant, for example, through data communicated between the user device 502 and the merchant device 505. Generally, when a customer and a merchant enter into an electronic financial transaction, the transaction is processed by transferring funds from a financial account associated with the user account to a financial account associated with the merchant account.

The payment system 508 is configured to send and receive data to and from the user device 502 and the merchant device 505. For example, the payment system 508 can be configured to send data describing merchants to the user device 502 using, for example, the information stored in the merchant information database 512. For example, the payment system 508 can communicate data describing merchants that are within a threshold geographic distance from a geographic location of the user device 502, as described in this specification. The data describing merchants can include, for example, a merchant name, geographic location, contact information, and an electronic catalogue, e.g., a menu, that describes items that are available for purchase from the merchant.

In some embodiments, the payment system 508 is configured to determine whether a geographic location of the user device 502 is within a threshold geographic distance from a geographic location of the merchant device 505. The payment system 508 can determine a geographic location of the user device 502 using, for example, geolocation data provided by the user device 502. Similarly, the payment system 508 can determine a geographic location of the merchant device 505 using, for example, geolocation data provided by the merchant device 505 or using a geographic address, e.g., street address, provided by the merchant. Depending on the implementation, the threshold geographic distance can be specified by the payment system 508 or by the merchant.

Determining whether the user device 502 is within a threshold geographic distance of the merchant device 505 can be accomplished in different ways including, for example, determining whether the user device 502 is within a threshold geographic radius of the merchant device 505, determining whether the user device 502 is within a particular geofence, or determining whether the user device 502 can communicate with the merchant device 505 using a specified wireless technology, e.g., Bluetooth or Bluetooth low energy (BLE). In some embodiments, the payment system 508 restricts card-less payment transactions between the customer 501 and the merchant 504 to situations where the geographic location of the user device 502 is within a threshold geographic distance from a geographic location of the merchant device 505.

The payment system 508 can also be configured to communicate with a computer system 516 of a card payment network, e.g., Visa or MasterCard, over the network 550, or over a different network, for example, to conduct electronic financial transactions. The computer system 516 of the card payment network can communicate with a computer system 518 of a card issuer, e.g., a bank. There may be computer systems of other entities, e.g., the card acquirer, between the payment system 508 and the computer system 518 of the card issuer.

The customer 501 operating the user device 502 that is within a threshold geographic distance of the merchant 504 can interact with a user application 503 running on the user device 502 to conduct a card-less payment transaction with the merchant 504. While interacting with the user application 503, the customer 501 can select the merchant 504, from a listing of merchants, with whom the customer 501 wants to enter into a card-less payment transaction. The user can select the merchant 504, for example, by selecting a "check in" option associated with the merchant 504. The user device 502 can communicate data to the payment system 508 indicating that the customer 501 has checked in with the merchant 504. In response, the payment system 508 can communicate data to notify the merchant device 505 that the user has checked in. A merchant application 506 running on the merchant device 505 can notify the merchant 504 that the user has electronically checked in with the merchant 504 through a display screen of the merchant device 505.

Once checked in, the customer 501 can collect, or request, items that are available for purchase from the merchant 504. When the customer 501 is ready to enter into the card-less payment transaction, the customer 501 can, for example, approach a point-of-sale for the merchant 504 and identify him or herself. For example, the customer 501 can verbally notify the merchant 504 that the customer 501 wants to enter into a card-less payment transaction and can provide the merchant 504 with the customer's name. The merchant 504 can then interact with the merchant application 506 to select the customer 501, from a listing of customers that have checked in with the merchant 504, to initiate a card-less payment transaction for the items being purchased by the customer 501. For example, the merchant 504 can determine a total amount to bill the customer 501 for the items being purchased. The customer 501 can verbally approve the total amount to be billed and, in response, the merchant 504 can submit a request for a card-less payment transaction for the total amount to the payment system 508. In response, the payment system 508 can obtain, for example, from the user information database 511, data describing a financial account associated with a user account of the customer 501 to which the total amount will be billed.

The payment system 508 can then communicate with the computer system 516 of a card payment network to complete an electronic financial transaction for the total amount to be billed to the customer's financial account. Once the electronic financial transaction is complete, the payment system 508 can communicate data describing the card-less payment transaction to the user device 502, e.g., an electronic receipt, which can, for example, notify the customer 501 of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method comprising:
    processing, by a payment server, a plurality of transactions between a plurality of customers and a plurality of merchants;
    training, by the payment server, a classifier with training data to obtain a trained classifier, the training data used for training the classifier including transaction information of the plurality of transactions processed by the payment server between the plurality of customers and the plurality of merchants;
    inputting, by the payment server, to the trained classifier, information related to one or more transactions that are associated with a user, the trained classifier trained to evaluate eligibility of the user to receive an offer for financing based at least on evaluating transactions in which the user participated and at least some of which were processed by the payment server;

determining, by the payment server, based on an output from the trained classifier, the eligibility of the user to receive the offer for the financing;

generating, by the payment server, the offer for the financing for an amount determined based at least in part on the eligibility of the user;

causing, by the payment server, presentation of the offer for the financing on a computing device associated with the user, wherein the offer specifies terms for the financing; and based at least on receiving an indication of acceptance of the offer, sending, by the payment server, at least one instruction for providing the financing.

2. The computer-implemented method as recited in claim 1, wherein:

a plurality of merchant devices are associated with the plurality of merchants, respectively; and respective merchant devices of the plurality of merchant devices are configured with respective instances of a merchant application that configures the respective merchant devices to send the transaction information to the payment server.

3. The computer-implemented method as recited in claim 1, further comprising storing the transaction information of the plurality of transactions processed by the payment server in a database configured to provide at least a portion of the transaction information as the training data.

4. The computer-implemented method as recited in claim 1, wherein causing presentation of the offer for the financing on the computing device associated with the user further comprises causing, at least in part, a user interface presented on the computing device associated with the user to present at least one interactive interface element selectable for specifying an amount of financing different from the determined amount.

5. The computer-implemented method as recited in claim 1, wherein the terms for the financing include repayment of the financing at a specified frequency over a specified period of time.

6. The computer-implemented method as recited in claim 1, wherein sending, by the payment server, the at least one instruction for providing the financing includes sending an instruction to associate an amount of financing with a payment instrument associated with the user.

7. The computer-implemented method as recited in claim 1, further comprising determining the eligibility of the user based in part on inputting, to the trained classifier, information related to one or more other users that have been determined to be similar to the user.

8. A system comprising:

one or more processors associated with at least one payment server, the one or more processors configured by executable instructions to perform operations comprising:

processing, by the one or more processors, a plurality of transactions between a plurality of customers and a plurality of merchants;

training, by the one or more processors, a classifier with training data to obtain a trained classifier, the training data used for training the classifier including transaction information of the plurality of transactions processed by the one or more processors between the plurality of customers and the plurality of merchants;

inputting, by the one or more processors, to the trained classifier, information related to one or more transactions that are associated with a user, the trained classifier trained to evaluate eligibility of the user to receive an offer for financing based at least on evaluating transactions in which the user participated and at least some of which were processed by the payment server;

determining, by the one or more processors, based on an output from the trained classifier, the eligibility of the user to receive the offer for the financing;

generating, by the one or more processors, the offer for the financing for an amount determined based at least in part on the eligibility of the user;

causing, by the one or more processors, presentation of the offer for the financing on a computing device associated with the user, wherein the offer specifies terms for the financing; and based at least on receiving an indication of acceptance of the offer, sending, by the one or more processors, at least one instruction for providing the financing.

9. The system as recited in claim 8, wherein:

a plurality of merchant devices are associated with the plurality of merchants, respectively; and respective merchant devices of the plurality of merchant devices are configured with respective instances of a merchant application that configures the respective merchant devices to send the transaction information to the payment server.

10. The system as recited in claim 8, the operations further comprising storing the transaction information of the plurality of transactions processed by the one or more processors in a database configured to provide at least a portion of the transaction information as the training data.

11. The system as recited in claim 8, wherein causing presentation of the offer for the financing on the computing device associated with the user further comprises causing, at least in part, a user interface presented on the computing device associated with the user to present at least one interactive interface element selectable for specifying an amount of financing different from the determined amount.

12. The system as recited in claim 8, wherein the terms for the financing include repayment of the financing at a specified frequency over a specified period of time.

13. The system as recited in claim 8, wherein sending, by the one or more processors, the at least one instruction for providing the financing includes sending an instruction to associate an amount of financing with a payment instrument associated with the user.

14. The system as recited in claim 8, the operations further comprising determining the eligibility of the user based in part on inputting, to the trained classifier, information related to one or more other users that have been determined to be similar to the user.

15. A non-transitory computer readable medium storing instructions executable by one or more processors associated with one or more payment servers to cause the one or more processors to perform operations comprising:

processing, by the one or more processors, a plurality of transactions between a plurality of customers and a plurality of merchants;

training, by the one or more processors, a classifier with training data to obtain a trained classifier, the training data used for training the classifier including transaction information of the plurality of transactions processed by the one or more processors between the plurality of customers and the plurality of merchants;

inputting, by the one or more processors, to the trained classifier, information related to one or more transactions that are associated with a user, the trained classifier trained to evaluate eligibility of the user to receive an offer for financing based at least on evaluating transactions in which the user participated and at least some of which were processed by the payment server;

determining, by the one or more processors, based on an output from the trained classifier, the eligibility of the user to receive the offer for the financing;

generating, by the one or more processors, the offer for the financing for an amount determined based at least in part on the eligibility of the user;

causing, by the one or more processors, presentation of the offer for the financing on a computing device associated with the user, wherein the offer specifies terms for the financing; and based at least on receiving an indication of acceptance of the offer, sending, by the one or more processors, at least one instruction for providing the financing.

16. The non-transitory computer readable medium as recited in claim 15, wherein:

a plurality of merchant devices are associated with the plurality of merchants, respectively; and respective merchant devices of the plurality of merchant devices are configured with respective instances of a merchant application that configures the respective merchant devices to send the transaction information to the payment server.

17. The non-transitory computer readable medium as recited in claim 15, the operations further comprising storing the transaction information of the plurality of transactions processed by the one or more processors in a database configured to provide at least a portion of the transaction information as the training data.

18. The non-transitory computer readable medium as recited in claim 15, wherein causing presentation of the offer for the financing on the computing device associated with the user further comprises causing, at least in part, a user interface presented on the computing device associated with the user to present at least one interactive interface element selectable for specifying an amount of financing different from the determined amount.

19. The non-transitory computer readable medium as recited in claim 15, wherein the terms for the financing include repayment of the financing at a specified frequency over a specified period of time.

20. The non-transitory computer readable medium as recited in claim 15, wherein sending, by the one or more processors, the at least one instruction for providing the financing includes sending an instruction to associate an amount of financing with a payment instrument associated with the user.

* * * * *